(12) United States Patent
Igarashi

(10) Patent No.: US 9,389,820 B2
(45) Date of Patent: Jul. 12, 2016

(54) INFORMATION PROCESSING APPARATUS AND CONTROL METHOD THEREOF, AND NON-TRANSITORY COMPUTER-READABLE MEDIUM

(71) Applicant: CANON KABUSHIKI KAISHA, Tokyo (JP)

(72) Inventor: Hiroya Igarashi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 4 days.

(21) Appl. No.: 14/640,311

(22) Filed: Mar. 6, 2015

(65) Prior Publication Data

US 2015/0268895 A1 Sep. 24, 2015

(30) Foreign Application Priority Data

Mar. 24, 2014 (JP) ................. 2014-060795

(51) Int. Cl.
 *G06F 3/12* (2006.01)
(52) U.S. Cl.
 CPC .............. *G06F 3/125* (2013.01); *G06F 3/1208* (2013.01); *G06F 3/1264* (2013.01)

(58) Field of Classification Search
 None
 See application file for complete search history.

(56) References Cited

U.S. PATENT DOCUMENTS

| 6,278,524 B1 * | 8/2001 | Kujirai et al. ................. 358/1.11 |
| 8,885,181 B2 * | 11/2014 | Williams et al. ............. 358/1.13 |
| 2009/0122326 A1 * | 5/2009 | Chiba et al. .................... 358/1.9 |

FOREIGN PATENT DOCUMENTS

JP 2007-184713 A 7/2007

* cited by examiner

*Primary Examiner* — Marivelisse Santiago Cordero
*Assistant Examiner* — Neil R McLean
(74) *Attorney, Agent, or Firm* — Fitzpatrick, Cella, Harper & Scinto

(57) ABSTRACT

An information processing apparatus comprises: a setting unit configured to accept a layout setting in a case of laying out a plurality of pages forming print data on one printing medium sheet and a punch processing setting on the printing medium; and a decision unit configured to decide on respective orientations of the plurality of pages laid out on the printing medium, based on the layout setting and the punch processing setting set by the setting unit.

12 Claims, 15 Drawing Sheets

FIG. 3A
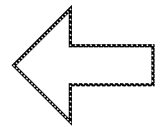
FIG. 3B
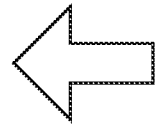
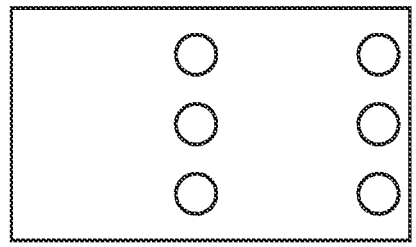
FIG. 3C
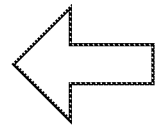
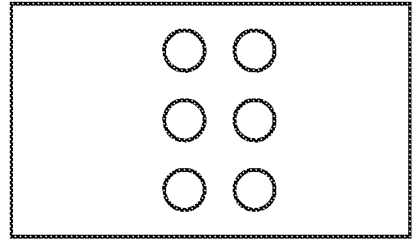

INFORMATION PROCESSING APPARATUS AND CONTROL METHOD THEREOF, AND NON-TRANSITORY COMPUTER-READABLE MEDIUM

BACKGROUND OF THE INVENTION

1. Field of the Invention

The present invention relates to an information processing apparatus and a control method thereof, and a non-transitory computer-readable medium.

2. Description of the Related Art

Conventionally, in order to reduce printing cost and improve productivity, there is a known technique that allows two or more images (pages) to be laid out on one sheet of storage medium (e.g., paper). Furthermore, there is a technique that changes the layout according to the ability of a cutting apparatus connected to the image forming apparatus (Japanese Patent Laid-Open No. 2007-184713, for example).

Recently, there is a punching machine for punching holes at a plurality of positions in one sheet of paper, assuming that paper is to be cut.

In the above-described conventional techniques, a layout method in consideration of the cutting capability can be employed, but it is not assumed that holes are punched at a plurality of positions in the paper before cutting. Thus, the conventional techniques are problematic in that holes cannot always be punched in the same direction with respect to images laid out on respective sheets obtained after cutting.

The present invention was arrived at in view of the above-described problem, and provides a technique that does not allow the punch positions to be unsuitable for the image orientations in respective pages obtained after cutting.

SUMMARY OF THE INVENTION

According to the present invention, it is possible to lay out data of a plurality of pages on one face of a storage medium, and, when punching the storage medium, to make the punch positions suitable for the layout.

According to one aspect of the present invention, there is provided an information processing apparatus comprising: a setting unit configured to accept a layout setting in a case of laying out a plurality of pages forming print data on one printing medium sheet and a punch processing setting on the printing medium; and a decision unit configured to decide on respective orientations of the plurality of pages laid out on the printing medium, based on the layout setting and the punch processing setting set by the setting unit.

According to another aspect of the present invention, there is provided a method for controlling an information processing apparatus, comprising: a setting step of accepting a layout setting in a case of laying out a plurality of pages forming print data on one printing medium sheet and a punch processing setting on the printing medium; and a deciding step of deciding on respective orientations of the plurality of pages laid out on the printing medium, based on the layout setting and the punch processing setting set in the setting step.

According to another aspect of the present invention, there is provided a non-transitory computer-readable medium storing a program for causing a computer to function as: a setting unit configured to accept a layout setting in a case of laying out a plurality of pages forming print data on one printing medium sheet and a punch processing setting on the printing medium; and a decision unit configured to decide on respective orientations of the plurality of pages laid out on the printing medium, based on the layout setting and the punch processing setting set by the setting unit.

Further features of the present invention will become apparent from the following description of exemplary embodiments with reference to the attached drawings.

BRIEF DESCRIPTION OF THE DRAWINGS

FIGS. 3A, 3B, and 3C are views showing the positions at which holes can be punched by a puncher.

DESCRIPTION OF THE EMBODIMENTS

Hereinafter, embodiments of the present invention will be described with reference to the drawings.

Figure 1:
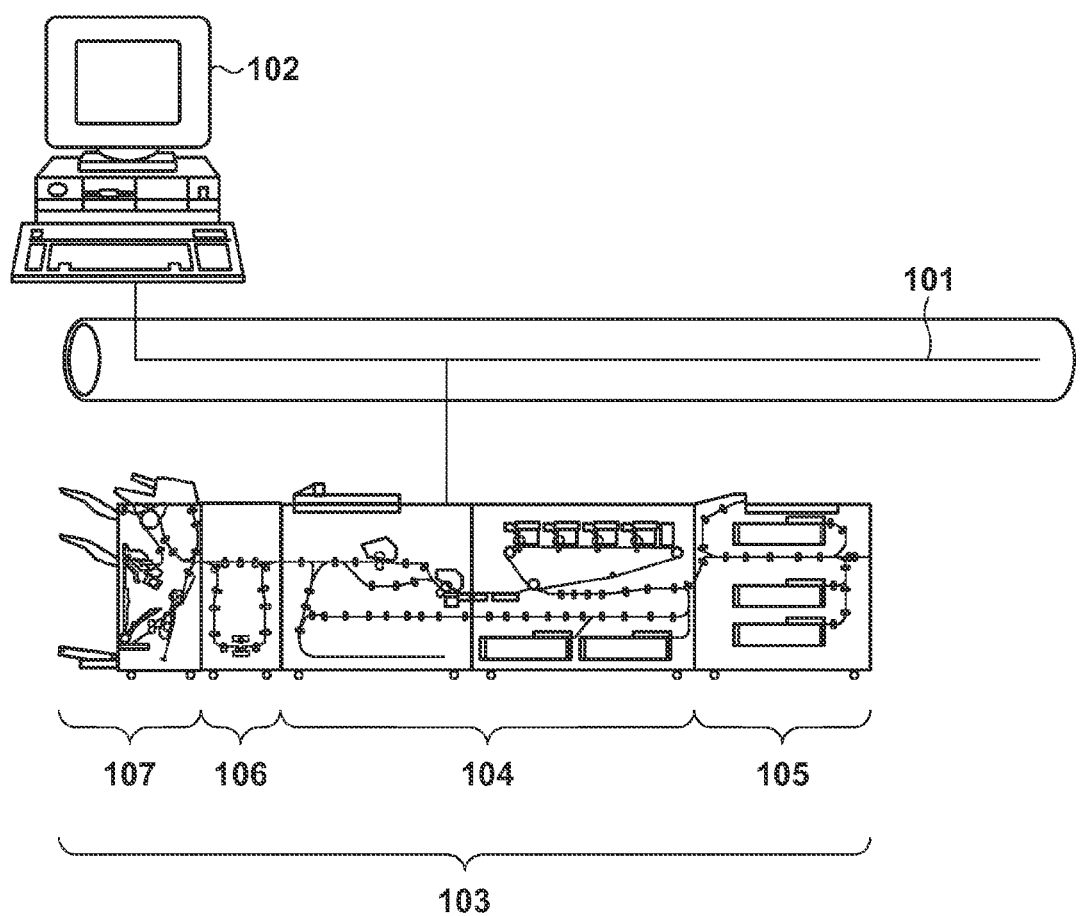
FIG. 1 is a schematic view of an image forming system showing one embodiment of the present invention.

FIG. 1 shows a configuration example of an image forming system of the present invention. In the image forming system, a client PC 102 and an image forming apparatus 103 are connected via a network 101. The image forming apparatus 103 is configured by connecting a main body unit 104, a large-volume paper feed deck 105, a puncher 106, and a finisher 107.

Figure 2:
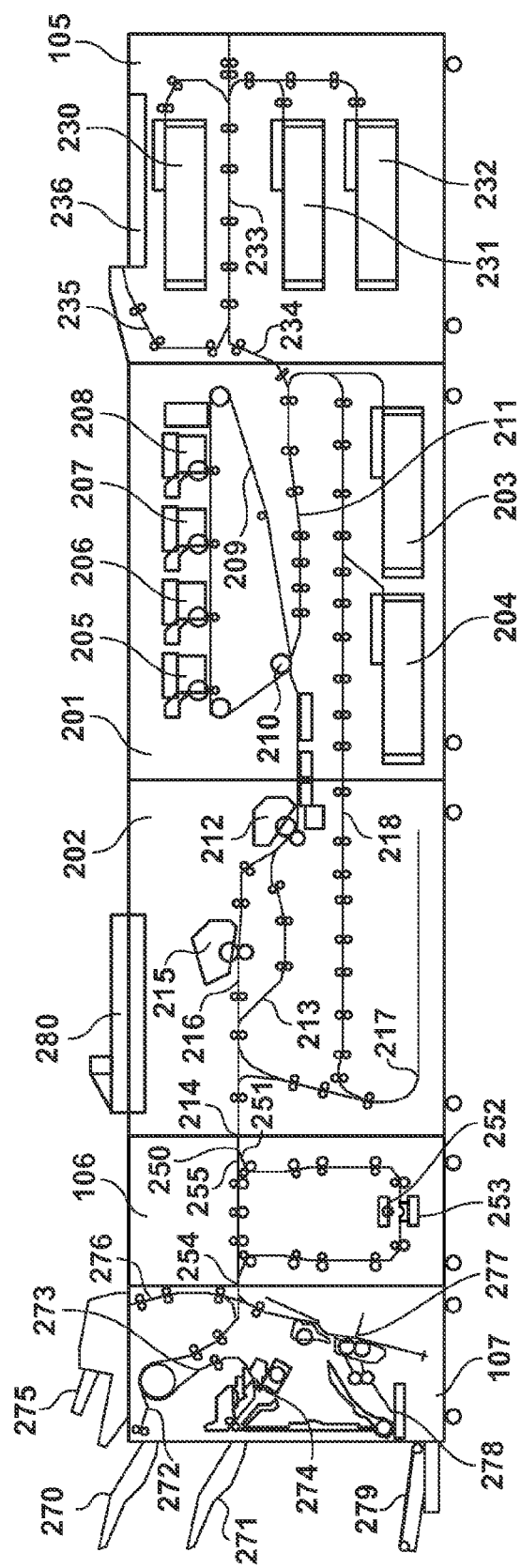
FIG. 2 is a cross-sectional view of an image forming apparatus showing the embodiment of the present invention.

FIG. 2 is a cross-sectional view of the image forming apparatus 103. The image forming apparatus 103 is configured by an image forming apparatus main body 201 mainly for an image forming operation and an image fixing apparatus 202 mainly for a fixing operation. With a series of operations by the image forming apparatus main body 201 and the image fixing apparatus 202, an image is formed on paper, which is a printing medium. Paper feed decks 203 and 204 in the image forming apparatus main body 201 operate as standard paper feed units. Development units 205 to 208 are configured by four stations corresponding to Y, M, C, and K for forming color images. Images formed by the respective development units are primarily transferred to an intermediate transfer belt 209. The intermediate transfer belt 209 rotates clockwise in FIG. 2. The image formed on the intermediate transfer belt 209 is transferred at a secondary transfer position 210 onto paper that has been conveyed along a conveyance path 211. The paper onto which the image has been transferred is passed from the image forming apparatus main body 201 to the image fixing apparatus 202, and is heated and pressed by a fixing unit 212 in the image fixing apparatus 202, so that the image is fixed to the paper.

After passing through the fixing unit 212, the paper is conveyed along a conveyance path 213 to a link portion 214 that is linked to the puncher 106. If the paper is of a type requiring additional heating and pressing for fixing, the paper after passing through the fixing unit 212 is conveyed along an upper conveyance path to a second fixing unit 215 where the paper is additionally heated and pressed. Subsequently, the paper is conveyed along a conveyance path 216 to the link portion 214. If the image forming mode is double-sided printing, the paper is conveyed to a paper reversing path 217, is reversed on the paper reversing path 217, and is then conveyed to a double-sided conveyance path 218. Then, the paper is again fed, and image formation is performed at the secondary transfer position 210 on a second side of the two sides of the paper.

Instead of the standard paper feed decks 203 and 204 of the image forming apparatus main body 201, three paper feed decks 230, 231, and 232 of the large-volume paper feed deck 105 may feed paper. The fed paper is conveyed along conveyance paths 233 and 234 to the image forming apparatus main body 201 where image formation is performed. The large-volume paper feed deck 105 has a mechanism (not shown) that detects multi-feeding in which a plurality of sheets of paper are conveyed in a state of being overlapped, and, in the case of detecting multi-feeding, the conveyance path is switched from a conveyance path 234 to a conveyance path 235 so that the paper is discharged to an escape tray 236.

Next, the puncher 106 will be described. The puncher 106 is a post processing apparatus for punching punch holes at predetermined positions of paper. Paper after image formation is conveyed from the image fixing apparatus 202 via the link portion 214 to a paper conveyor unit of the puncher 106. If there is a punch designation, the paper is conveyed from a conveyance path 250 via a conveyance path 251 to a position where the paper is pressed between a projecting punch die 252 and a recessed punch die 253 so that punch holes are punched. The punch dies can be changed, and the user can set appropriate dies according to the purpose.

The punching method with the puncher 106 can be applied not only to an ordinary case in which holes are punched at the trailing edge as shown in FIG. 3A but also to a case in which holes are punched at a plurality of positions (two positions in this example) as shown in FIGS. 3B and 3C assuming that cutting is to be performed. In this specification, the punching as shown in FIG. 3B is referred to as inner-outer punch and the punching as shown in FIG. 3C is referred to as inner-inner punch. Note that inner-inner punch as shown in FIG. 3C using punch dies having a large number of holes such as 30 holes is inhibited because the strength of paper near the punch holes is lowered and problems such as tearing of the paper may occur. Thus, the types of dies that can be used are different between the inner-outer punch and the inner-inner punch. When the punch processing is ended, the paper is conveyed, via a connection portion 254 that is connected to the finisher 107, to the finisher 107. If there is no punch designation, the paper is conveyed from the conveyance path 250 via a conveyance path 255 to the finisher 107.

Next, the finisher 107 will be described. The finisher 107 performs post processing on the paper after the printing, according to the function designated by the user. Specifically, the finisher 107 has functions such as stapling, punching different from that by the puncher 106, and saddle stitching. The finisher 107 includes discharge trays 270 and 271. The paper is discharged via a conveyance path 272 onto the discharge tray 270. When performing stapling or punching, the paper is conveyed along a conveyance path 273 to a processing unit 274 where the paper is subjected to finishing with the function designated by the user, and is discharged onto the discharge tray 271.

The discharge trays 270 and 271 can be vertically moved, and, thus, the discharge tray 270 can be lowered so that the paper after the finishing by the processing unit 274 is discharged from the lower discharge port onto that discharge tray. If insertion of paper is designated by the user, paper for insertion set at an inserter 275 can be inserted via a conveyance path 276 at a given page. If saddle stitching is designated, the paper is stapled at the middle and folded in half by a saddle processing unit 277, and is conveyed along a conveyance path 278 onto a saddle stitching tray 279. The saddle stitching tray 279 has a belt conveyor structure, and the paper bundle after the saddle stitching placed on the saddle stitching tray 279 is conveyed to the left.

Hardware Configuration

Figure 4:
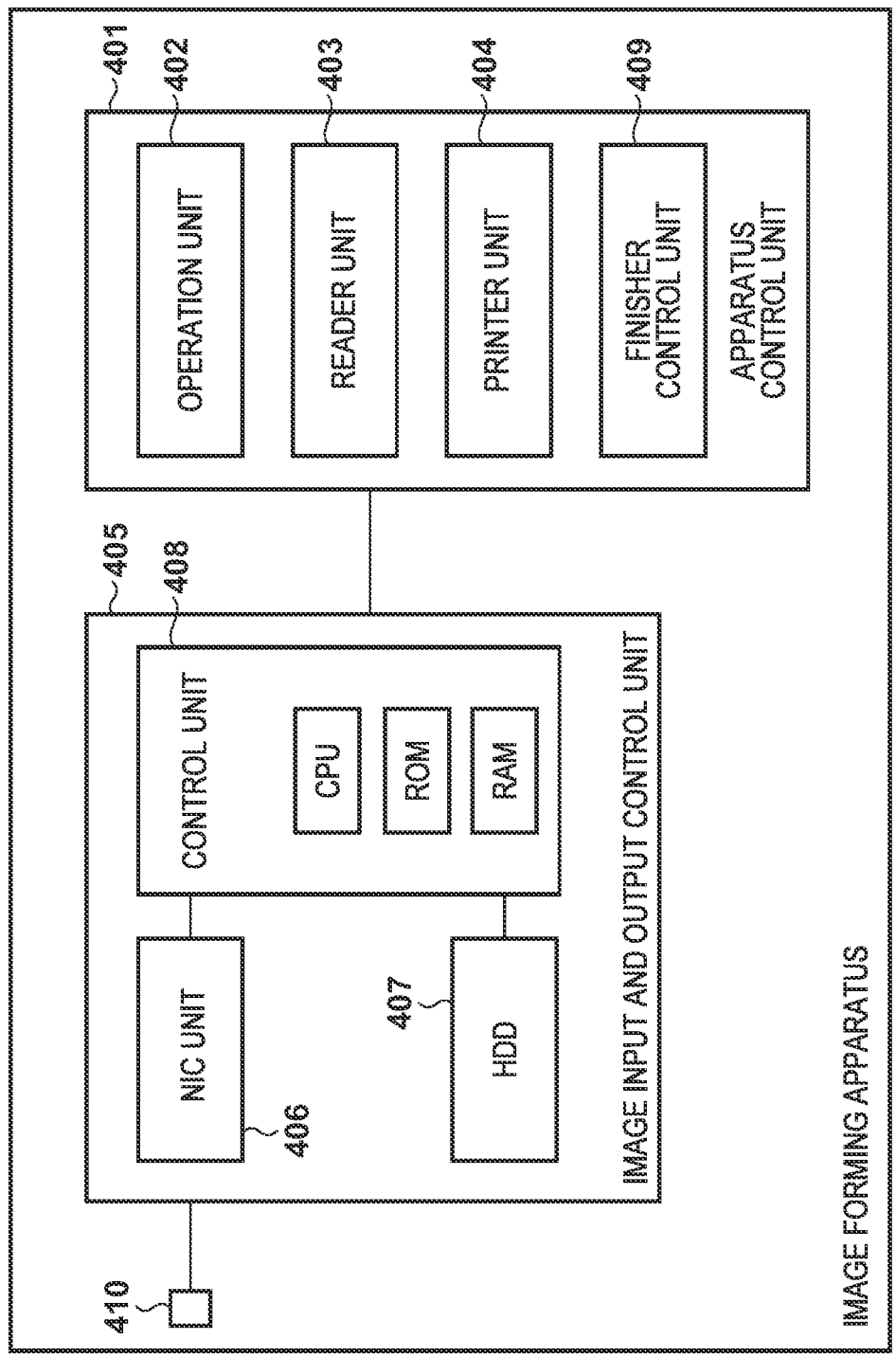
FIG. 4 is a diagram showing a configuration example of a print control device showing the embodiment of the present invention.

FIG. 4 shows a configuration example of the image forming apparatus 103. The image forming apparatus 103 is configured roughly by an apparatus control unit 401 and an image input and output control unit 405.

The apparatus control unit 401 includes an operation unit 402, a reader unit 403, a printer unit 404, and a finisher control unit 409. The operation unit 402 performs control of user operations such as various settings of the image forming apparatus 103 and settings in a copy operation. The reader unit 403 performs control in a document reading operation. The printer unit 404 performs control relating to print control. The finisher control unit 409 performs control of the post processing apparatus.

The image input and output control unit 405 includes an NIC unit 406, a hard disk (HDD) 407, and a control unit 408. The NIC unit 406 is connected to a connector 410, and, for example, receives print data from an external apparatus such as the client PC 102, which is an information processing apparatus. The received data can be stored via the control unit 408 in the HDD 407 or the like, or can be used for printing or post processing by the apparatus control unit 401. The control unit 408 performs interpretation of the print data or image processing necessary for printing, and sends the printable data to the apparatus control unit 401.

Cut and Stack Printing

Figure 5A:
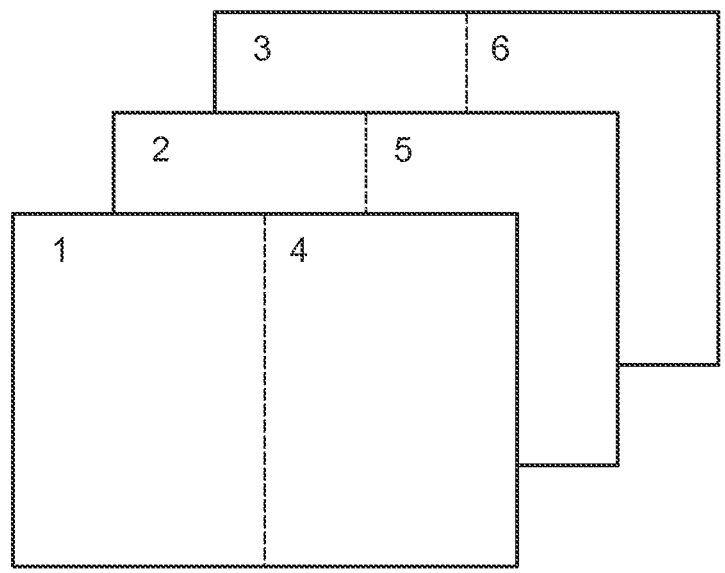
FIGS. 5A and 5B are views showing an example of cut and stack layouts.
Figure 5B:
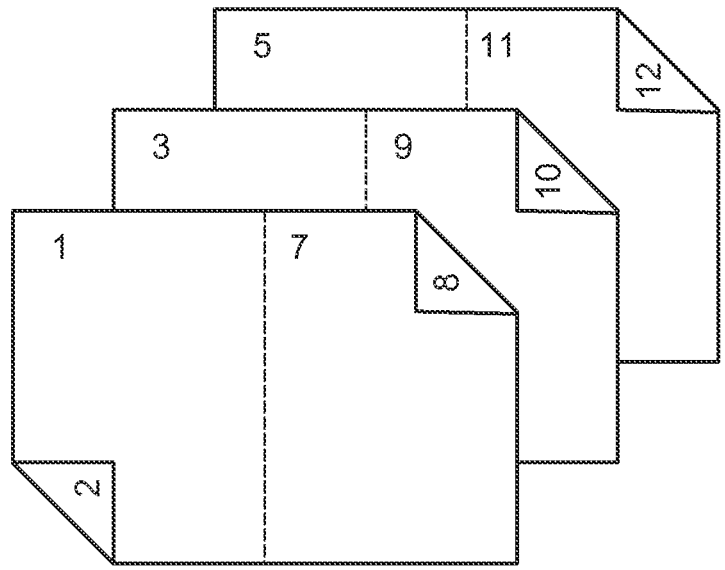

Next, cut and stack printing (also referred to as anterior half/posterior half printing) will be described with reference to FIGS. 5A and 5B. The cut and stack printing is a type of N-in-1 printing, and is a printing method for executing one printing job (it may be a plurality of combined jobs) such that a plurality of pages are arranged on one sheet of paper. This method is different from the N-in-1 printing in that the printed paper is cut into pieces that will be stacked in ascending order of page number so that the same materials as those in ordinary printing are obtained. FIG. 5A shows a layout for cut and stack printing in which 6 pages are laid out on sheets on a single side of paper. FIG. 5B shows a layout for cut and stack printing in which 12 pages are laid out on sheets on both sides of paper. In both cases, two pages are arranged on a single side of one sheet of paper. For example, 2-in-1 printing may be performed on A3 paper in order to obtain A4 materials after cutting.

FIGS. 6A to 6D show layouts in which single-sided cut and stack printing is combined with punching. FIGS. 7A to 7D show layouts in which double-sided cut and stack printing is combined with punching. The puncher 106 can punch holes at a plurality of positions in paper, but has to maintain the same relative relationship between the punch position and the image orientation between sheets of the paper obtained after cutting. For example, in the case of inner-outer punch as in FIGS. 6A, 6B, 7A, and 7B, the left and the right of paper have the same image orientation, and, in the case of inner-inner punch as in FIGS. 6C, 6D, 7C, and 7D, the left and the right of paper have image orientations that are different from each other by 180°. In embodiments below, methods for selecting the layout and the punch position will be described.

First Embodiment

Figure 8:
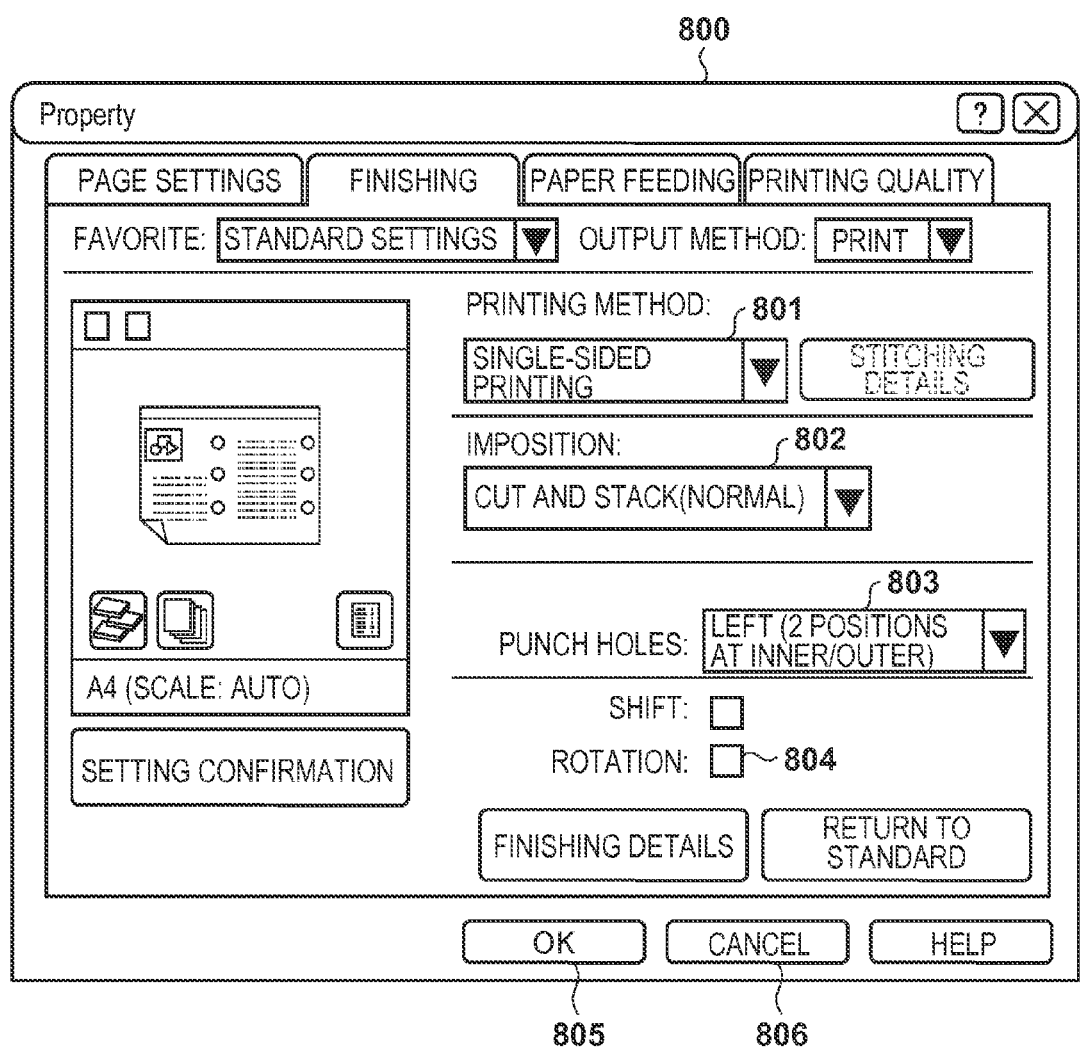
FIG. 8 is a view showing an exemplary screen of a printer driver according to a first embodiment.

FIG. 8 shows a configuration example of a setting screen provided by a printer driver (not shown) according to a first embodiment. The printer driver (not shown) is included in the client PC 102, which is an information processing apparatus, and various settings relating to printing can be made on a setting screen 800 of the printer driver.

In a setting item 801, "single-sided" or "double-sided" can be set as the printing method. That is to say, single-sided printing or double-sided printing can be designated. In a setting item 802, settings regarding imposition (layout) can be made. In this example, ordinary "N-in-1 printing" or "cut and stack printing" can be set. In the case of the cut and stack printing, a normal mode (FIG. 6A, etc.) in which the left and right pages have the same image orientation or a cross mode (FIG. 6C, etc.) in which the left and right pages have image orientations that are different from each other by 180° can be selected. In a setting item 803, punch holes can be set. In the punch hole setting, for example, a normal mode in which holes are punched at one edge of paper or a mode in which holes are punched at two positions for cut and stack printing can be selected.

Figure 6A:
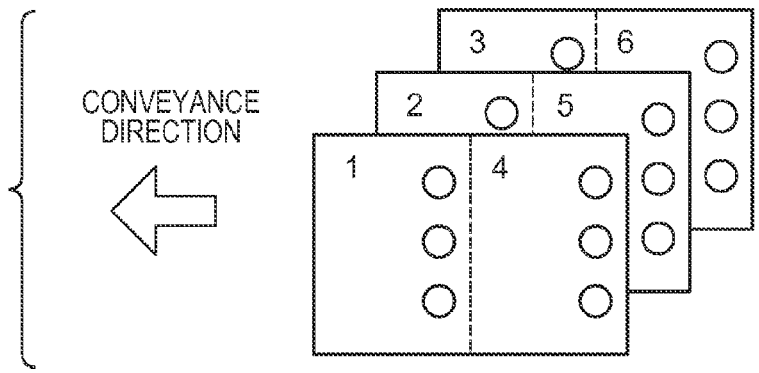
FIGS. 6A, 6B, 6C, and 6D are views showing an example of cut and stack layouts in single-sided printing and punch positions.
Figure 6B:
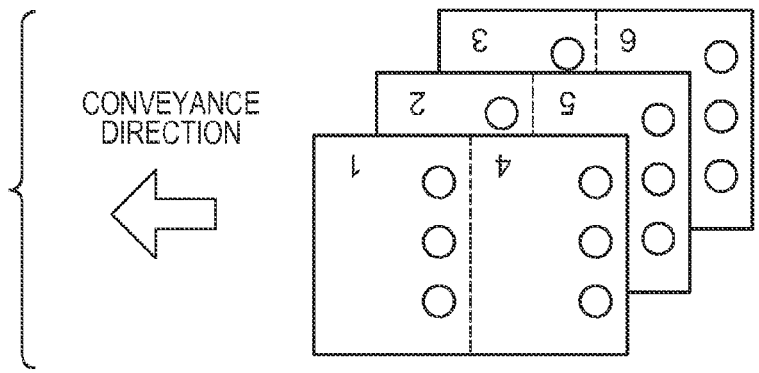
Figure 6C:
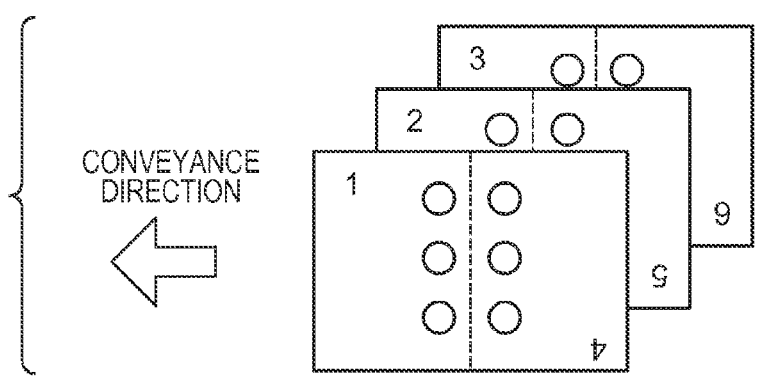
Figure 6D:
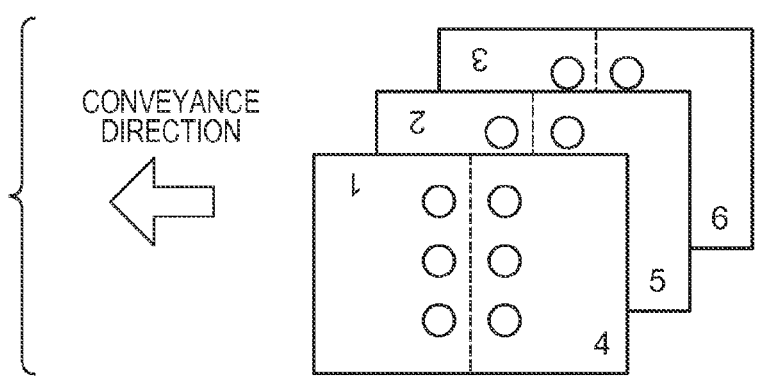
Figure 7A:
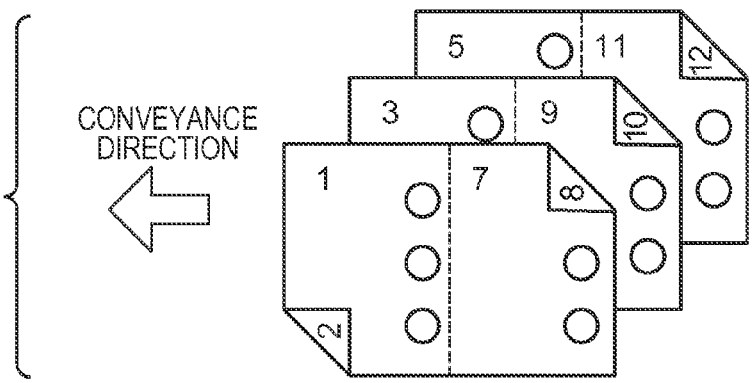
FIGS. 7A, 7B, 7C, and 7D are views showing an example of cut and stack layouts in double-sided printing and punch positions.
Figure 7B:
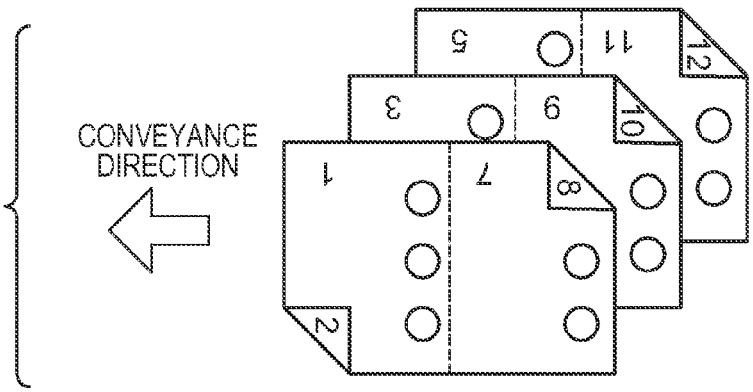
Figure 7C:
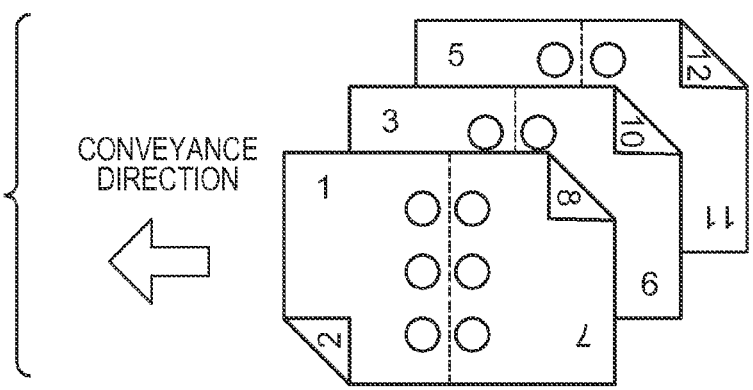
Figure 7D:
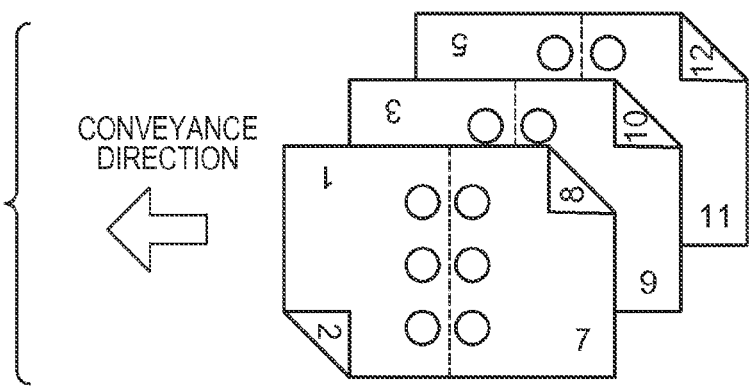

In a setting item 804, whether or not to rotate images by 180° for printing can be selected. In the case of the cut and stack printing, it is not that images after layout are rotated by 180° but that images before layout are rotated by 180°. In the case of FIGS. 6A to 6D, for example, FIGS. 6A and 6B are different in whether or not rotation is performed, and the same is applied to FIGS. 6C and 6D. If an OK button 805 is pressed by the user, the client PC 102 sends a printing job based on the set content to the image forming apparatus 103. If a cancel button 806 is pressed by the user, the printer driver cancels the printing.

Processing Flow

Figure 9:
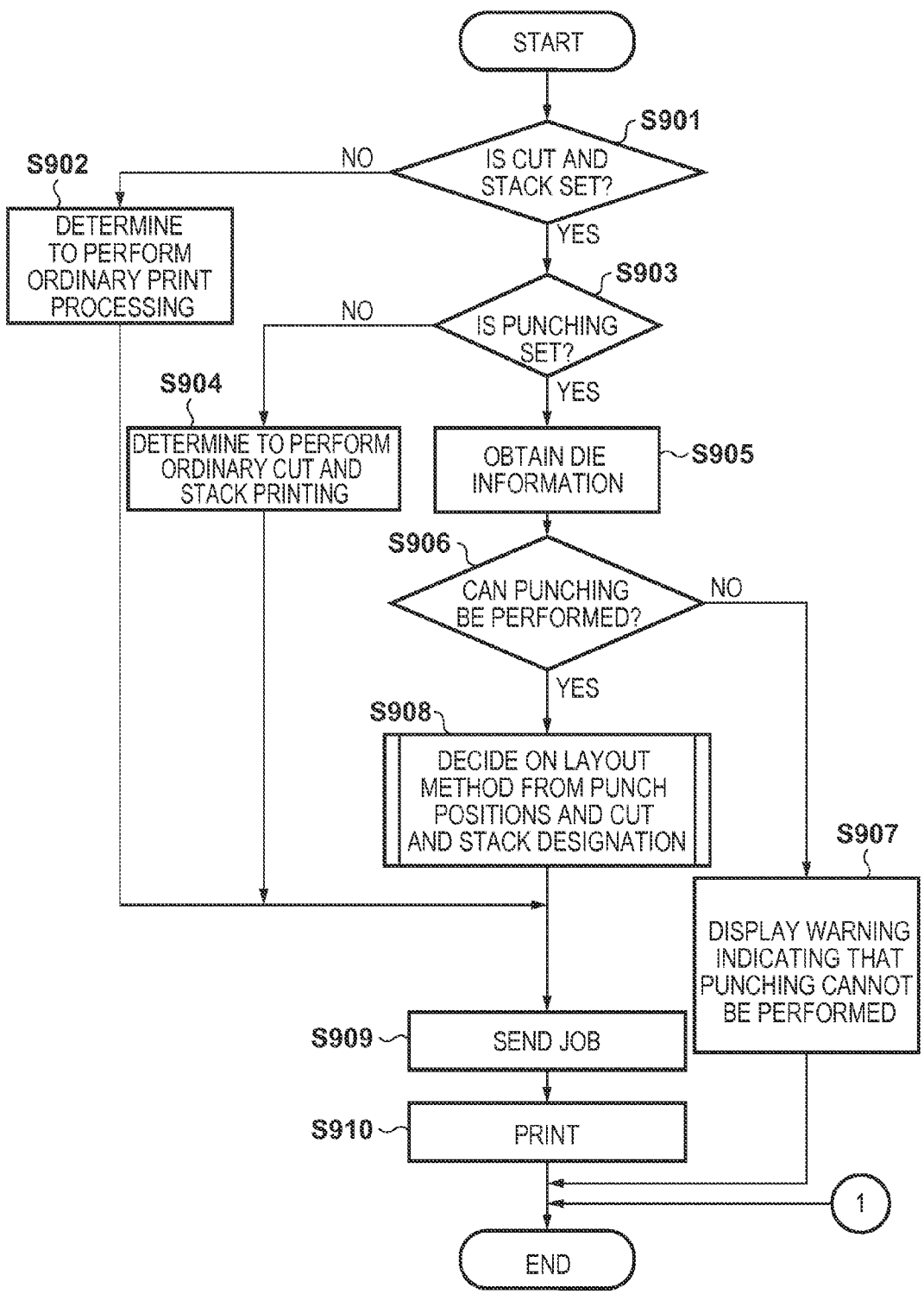
FIG. 9 is a flowchart according to the first embodiment.

FIG. 9 is a flowchart according to the first embodiment. In this embodiment, the processing flow is realized by a CPU (not shown) of the client PC 102 reading and executing a program relating to the printer driver stored in a storage unit such as an HDD (not shown).

If the OK button 805 in the setting screen 800 is pressed by the user, this flowchart is started. In S901, the printer driver determines whether or not the printing method (the setting item 802) set for the job is cut and stack printing. If it is not cut and stack printing (NO in S901), the procedure advances to S902. If it is cut and stack printing (YES in S901), the procedure advances to S903.

In S902, the printer driver determines that the designated job is ordinary print processing. Subsequently, the procedure advances to S909 where the printer driver sends the printing job to the image forming apparatus 103.

In S903, the printer driver determines whether or not punching (the setting item 803) is set. If punching is not set (NO in S903), the procedure advances to S904. If punching is set (YES in S903), the procedure advances to S905.

In S904, the printer driver determines that the designated job is ordinary cut and stack printing. Subsequently, the procedure advances to S909 where the printer driver sends the printing job to the image forming apparatus 103.

In S905, the printer driver obtains information of the punch dies of the puncher 106 from the finisher control unit 409 included in the apparatus control unit 401 of the image forming apparatus 103. In S906, the printer driver determines whether or not the designated punch processing can be performed based on the cut and stack printing setting and the information of the punch dies. Specifically, the printer driver determines whether or not two positions of inner-inner punch or inner-outer punch are set for the cut and stack. If it is determined that punching cannot be performed (NO in S906), the procedure advances to S907. If it is determined that punching can be performed (YES in S906), the procedure advances to S908.

Figure 11:
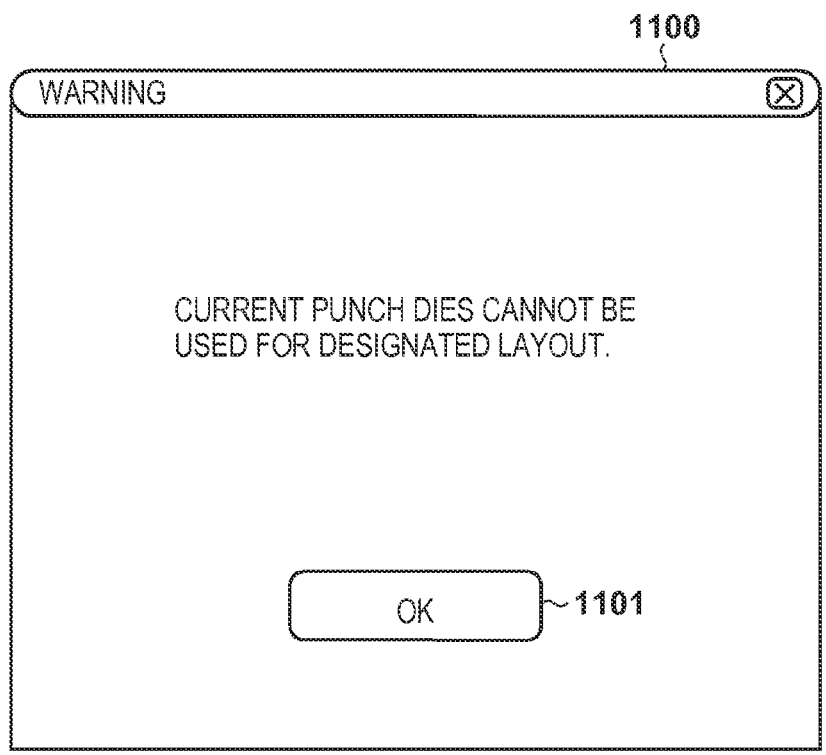
FIG. 11 is a view showing an exemplary warning screen according to the first embodiment.

In S907, the printer driver displays, for example, a warning screen 1100 as shown in FIG. 11 according to the determination results. If an OK button 1101 in the warning screen 1100 is pressed by the user, the printer driver again displays the setting screen 800 in FIG. 8, and ends the flowchart.

Figure 10:
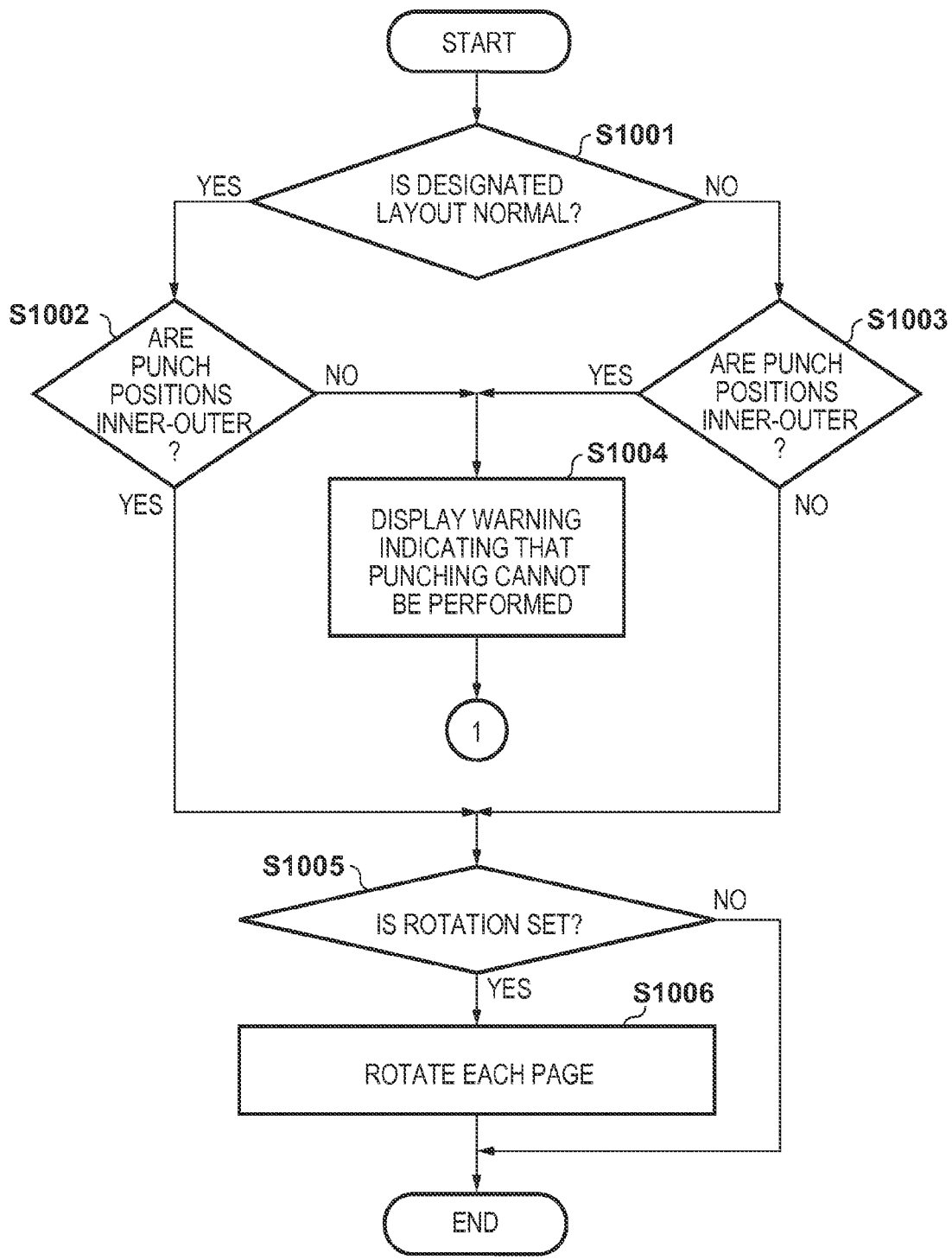
FIG. 10 shows a sub routine of S908 according to the first embodiment.

In S908, the printer driver determines whether or not the punch positions are suitable for the image orientations in the cut and stack. This step will be described in detail with reference to FIG. 10. In the sub flow shown in FIG. 10, the layout is decided on according to a combination of the imposition setting and the punch positions. In S1001, the printer driver determines whether the cut and stack setting (the setting item 802) is the normal (layout in which the images have the same image orientation) or the cross (layout in which the images have image orientations that are different from each other by 180°). If it is the normal setting (YES in S1001), the procedure advances to S1002. If it is the cross setting (NO in S1001), the procedure advances to S1003.

In S1002, the printer driver determines whether the punch positions are those for inner-inner punch or those for inner-outer punch. If the punch positions are those for inner-inner punch (NO in S1002), the procedure advances to S1004. If the punch positions are those for inner-outer punch (YES in S1002), the procedure advances to S1005.

In S1003, the printer driver determines whether the punch positions are those for inner-inner punch or those for inner-outer punch. If the punch positions are those for inner-inner punch (NO in S1003), the procedure advances to S1005. If the punch positions are those for inner-outer punch (YES in S1003), the procedure advances to S1004.

Figure 12:
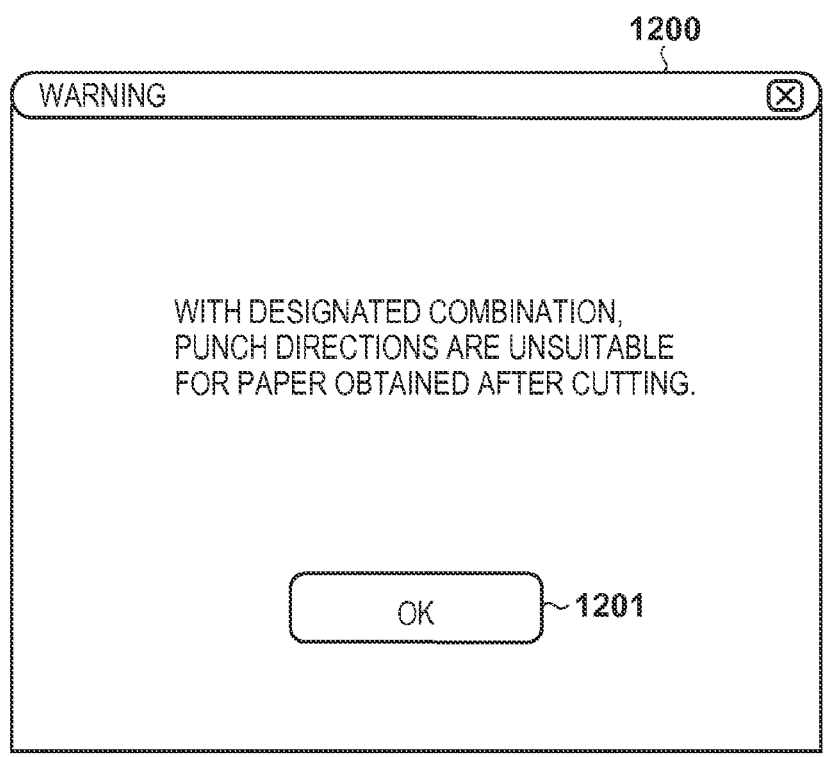
FIG. 12 is a view showing an exemplary warning screen according to the first embodiment.

In S1004, the printer driver displays, for example, a warning screen 1200 as shown in FIG. 12 indicating that punching cannot be performed. If an OK button 1201 in the warning screen 1200 is pressed by the user, the printer driver again displays the setting screen in FIG. 8, and ends the flowchart.

In S1005, the printer driver determines whether or not rotation is set, that is, determines the settings regarding the setting item 804. If rotation is set (YES in S1005), the procedure advances to S1006. If rotation is not set (NO in S1005), this flowchart is ended and the procedure advances to S909.

In S1006, the printer driver rotates image data of each page laid out on the paper. This flowchart is ended and the procedure advances to S909.

In S909, the printer driver generates a printing job (settings and image data) based on the printing settings, and sends it to the image forming apparatus 103. In S910, the control unit 408 of the image forming apparatus 103 analyzes the printing job received from the client PC 102, and performs printing. This processing flow is ended.

Note that it is possible that, in S1006, the printer driver does not rotate images, and sends the rotation settings to the image forming apparatus 103 in S909. In that case, it is possible that, in S910, the control unit 408 of the image forming apparatus 103 determines whether or not there are the rotation settings, and performs printing while rotating the images. Also, it is possible that the information of the dies in S905 is obtained in advance, and the punch positions that can be set in the setting item 803 are limited according to the cut and stack setting in S901. Although this embodiment showed an example in which two pages are laid out on a single side of one sheet, there is no limitation to this, and a larger number of pages may be laid out and be separated by cutting. In this case, the number of combinations for layouts becomes larger.

As described above, it is determined whether or not the punching method is suitable for the image orientations based on the cut and stack printing and the punch designation, thereby preventing the punching from being unsuitable for the image orientations.

Second Embodiment

In the first embodiment, whether or not the punch positions are suitable for the image orientations is determined, but the user has to select, in the setting screen, the image orientations and the punch positions (inner-inner punch or inner-outer punch) in paper that has not been cut yet. However, it may be more desirable for the user to be able to designate which side of each sheet of paper obtained after cutting is to be punched by selecting from among the left and the right.

Figure 13:
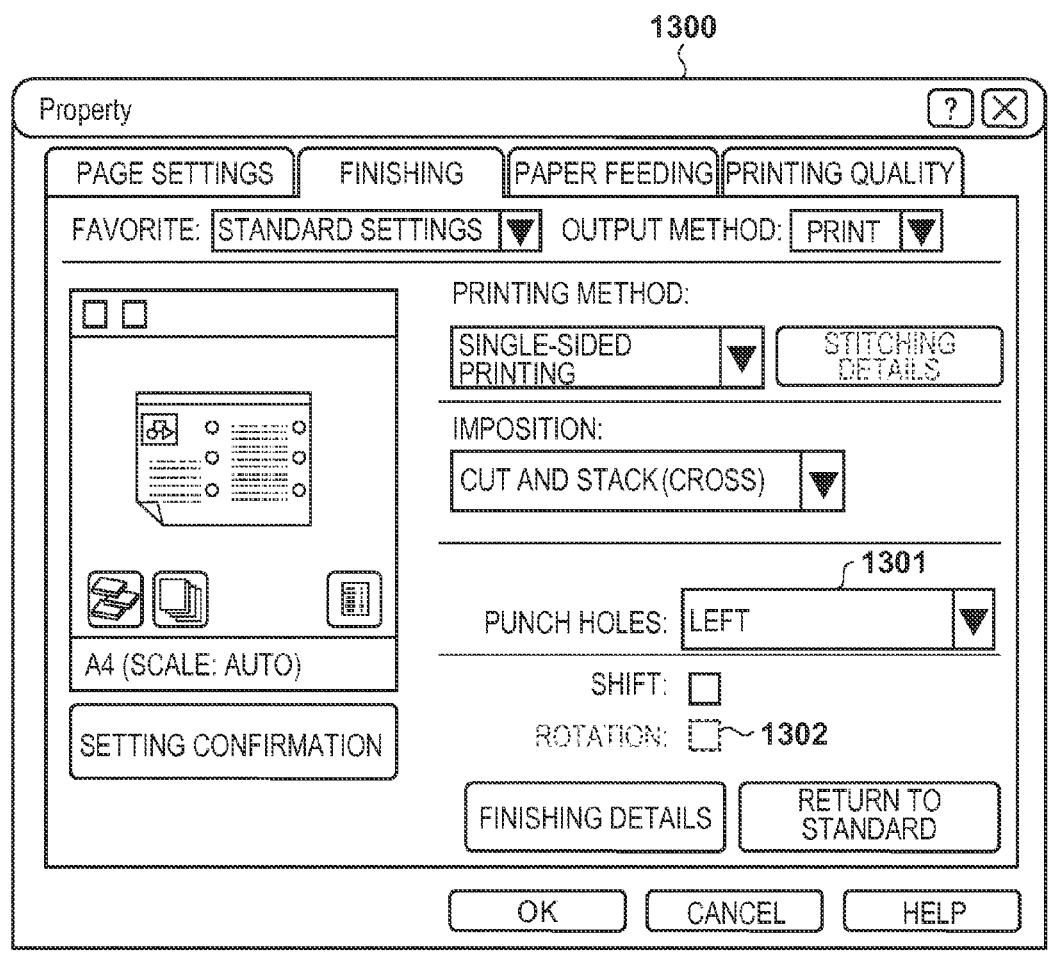
FIG. 13 is a view showing an exemplary screen of a printer driver according to a second embodiment.

Hereinafter, a second embodiment corresponding to this configuration will be described with reference to FIGS. 13 to 16. FIG. 13 shows a configuration example of a setting screen 1300 provided by a printer driver according to the second embodiment. This embodiment is different from the first embodiment in a setting item 1301 for the punch hole designation method and a setting item 1302 for the rotation designation.

Although punch holes are typically punched at one edge of paper, the punch hole designation of the setting item 1301 in a case where the cut and stack printing is set is interpreted as designation of which one edge is to be punched in each sheet of paper obtained after cutting. That is to say, in the cut and stack printing, inner-inner punch or inner-outer punch is designated according to the imposition method. The setting item 1302 for the rotation is grayed out in the cut and stack printing, so that the settings cannot be made. The reason for this is that the image orientations are automatically decided on from the cut and stack printing setting and the punch hole designation.

Processing Flow

Figure 14:
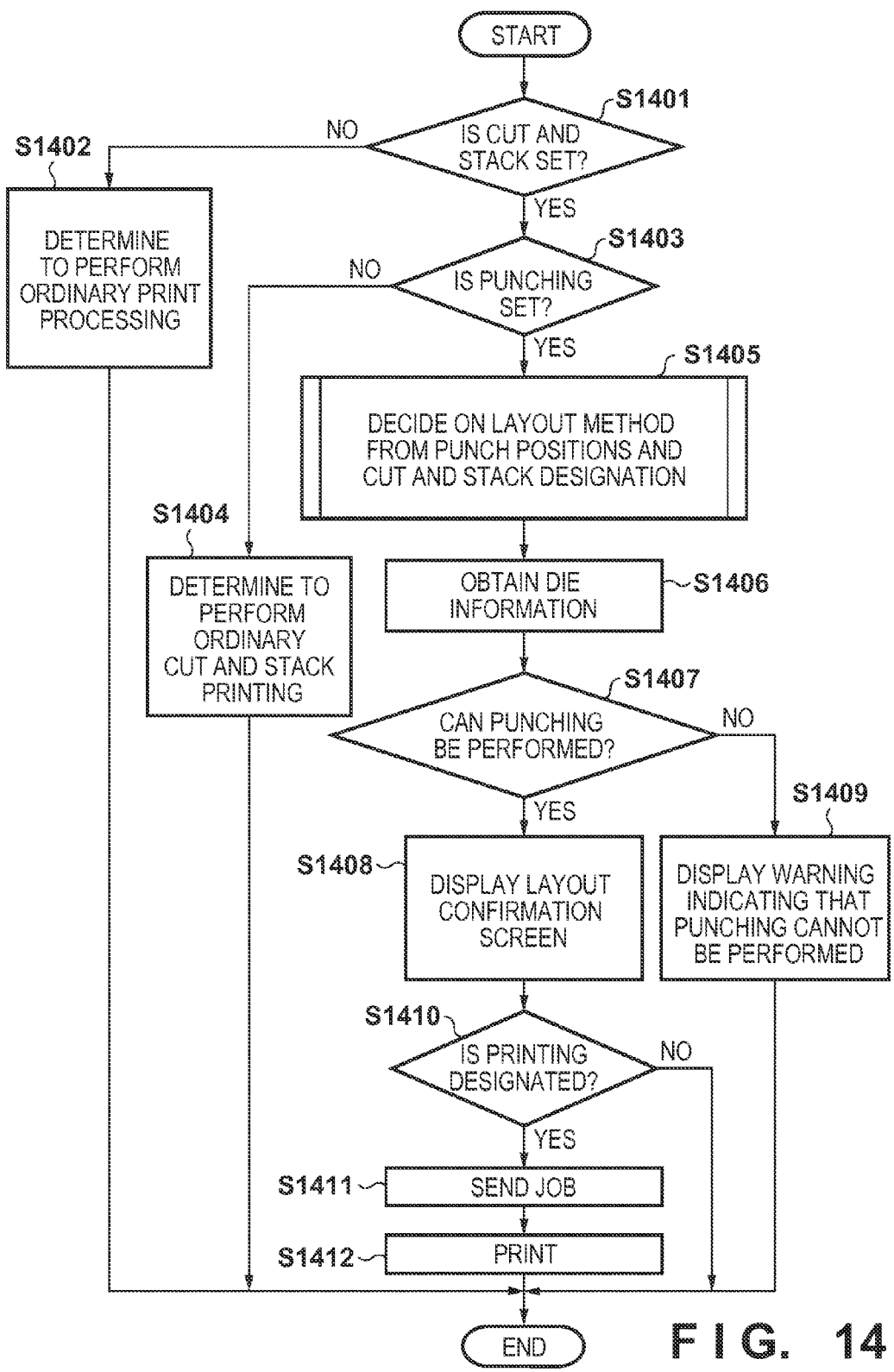
FIG. 14 is a flowchart according to the second embodiment.

Hereinafter, the processing flow according to the second embodiment will be described with reference to FIGS. 14. S1401 to S1404 are the same as S901 to S904 in FIG. 9 described in the first embodiment, and, thus, a description thereof has been omitted.

If punching (the setting item 1301) is set (YES in S1403), in S1405, the printer driver decides on the layout from the cut and stack designation and the punch positions.

Figure 15:
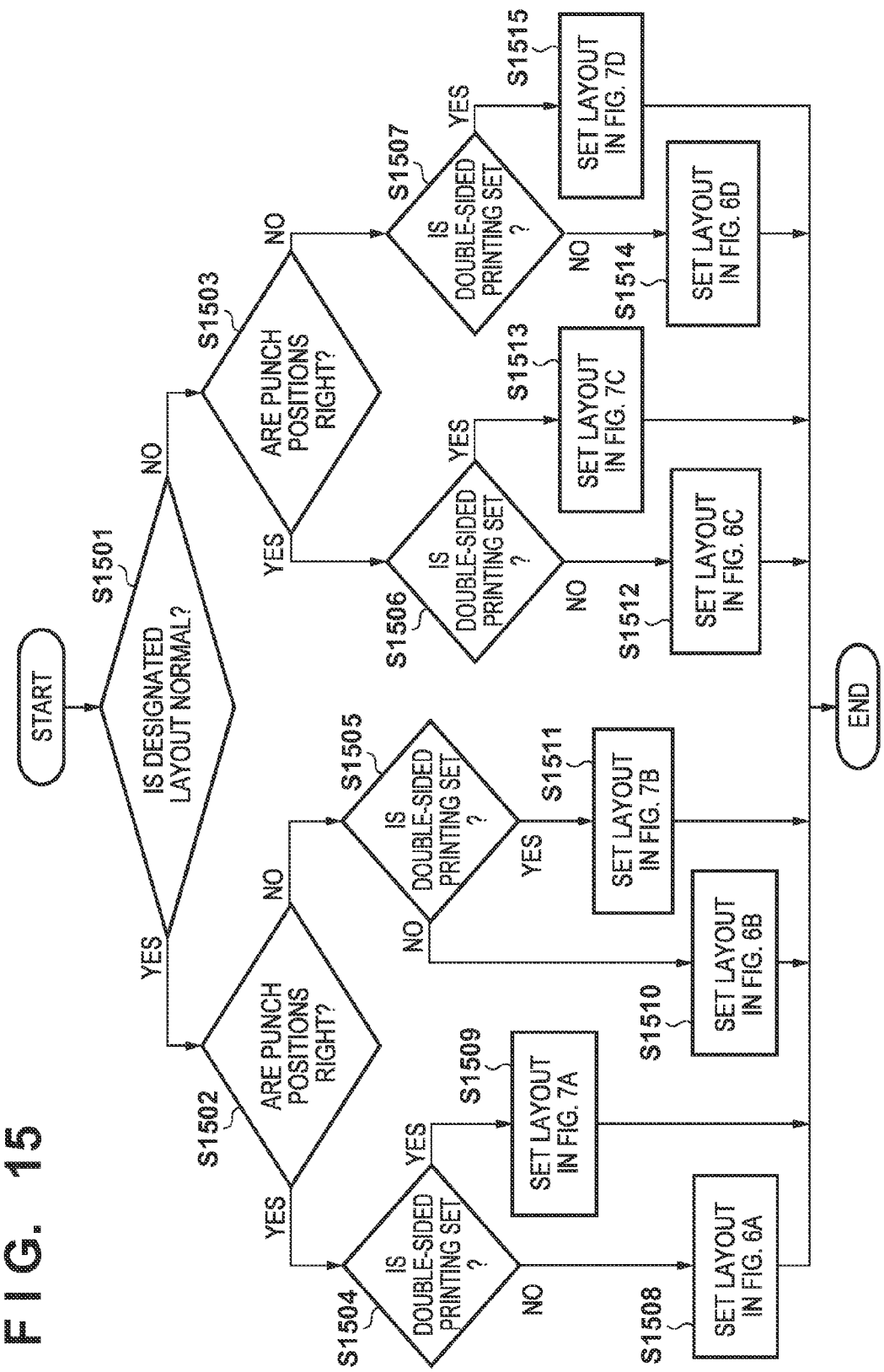
FIG. 15 shows a sub routine of S1405 according to the second embodiment.

Hereinafter, S1405 will be described in detail with reference to FIG. 15. In the sub flow shown in FIG. 15, the image layout is decided on according to a combination of the imposition setting and the punch positions. In S1501, the printer driver determines whether the cut and stack setting is the normal or the cross. If it is the normal (YES in S1501), the procedure advances to S1502. If it is the cross (NO in S1501), the procedure advances to S1503.

In S1502, the printer driver determines whether the punch positions are to be located at the right or the left of paper after cutting. As described above, the left or the right in this case refers to the left or the right of pages laid out on one sheet of paper on which punching is to be performed. If the punch positions are on the right (YES in S1502), the procedure advances to S1504. If the punch positions are on the left (NO in S1502), the procedure advances to S1505.

In S1503, the printer driver determines whether the punch positions are to be located at the right or the left of paper after cutting. If the punch positions are on the right (YES in S1503), the procedure advances to S1506. If the punch positions are on the left (NO in S1503), the procedure advances to S1507.

In S1504, the printer driver determines whether or not the double-sided printing is designated in the settings of the printing method. If the double-sided printing is not designated (NO in S1504), the procedure advances to S1508. If the double-sided printing is designated (YES in S1504), the procedure advances to S1509. In S1505, the printer driver determines whether or not the double-sided printing is designated. If the double-sided printing is not designated (NO in S1505), the procedure advances to S1510. If the double-sided printing is designated (YES in S1505), the procedure advances to S1511.

In S1506, the printer driver determines whether or not the double-sided printing is designated. If the double-sided printing is not designated (NO in S1506), the procedure advances to S1512. If the double-sided printing is designated (YES in S1506), the procedure advances to S1513. In S1507, the printer driver determines whether or not the double-sided printing is designated. If the double-sided printing is not designated (NO in S1507), the procedure advances to S1514. If the double-sided printing is designated (YES in S1507), the procedure advances to S1515.

S1508 to S1515 are steps of performing image imposition to realize the layouts corresponding to those in FIGS. 6A to 6D and 7A to 7D. In S1508, the printer driver performs image imposition to realize the layout shown in FIG. 6A. In S1509, the printer driver performs image imposition to realize the layout shown in FIG. 7A. In S1510, the printer driver performs image imposition to realize the layout shown in FIG. 6B. In S1511, the printer driver performs image imposition to realize the layout shown in FIG. 7B. In 51512, the printer driver performs image imposition to realize the layout shown in FIG. 6C. In S1513, the printer driver performs image imposition to realize the layout shown in FIG. 7C. In S1514, the printer driver performs image imposition to realize the layout shown in FIG. 6D. In S1515, the printer driver performs image imposition to realize the layout shown in FIG. 7D. After processing in S1508 to S1515, the processing flow is ended, and the procedure advances to S1406.

Figure 16:
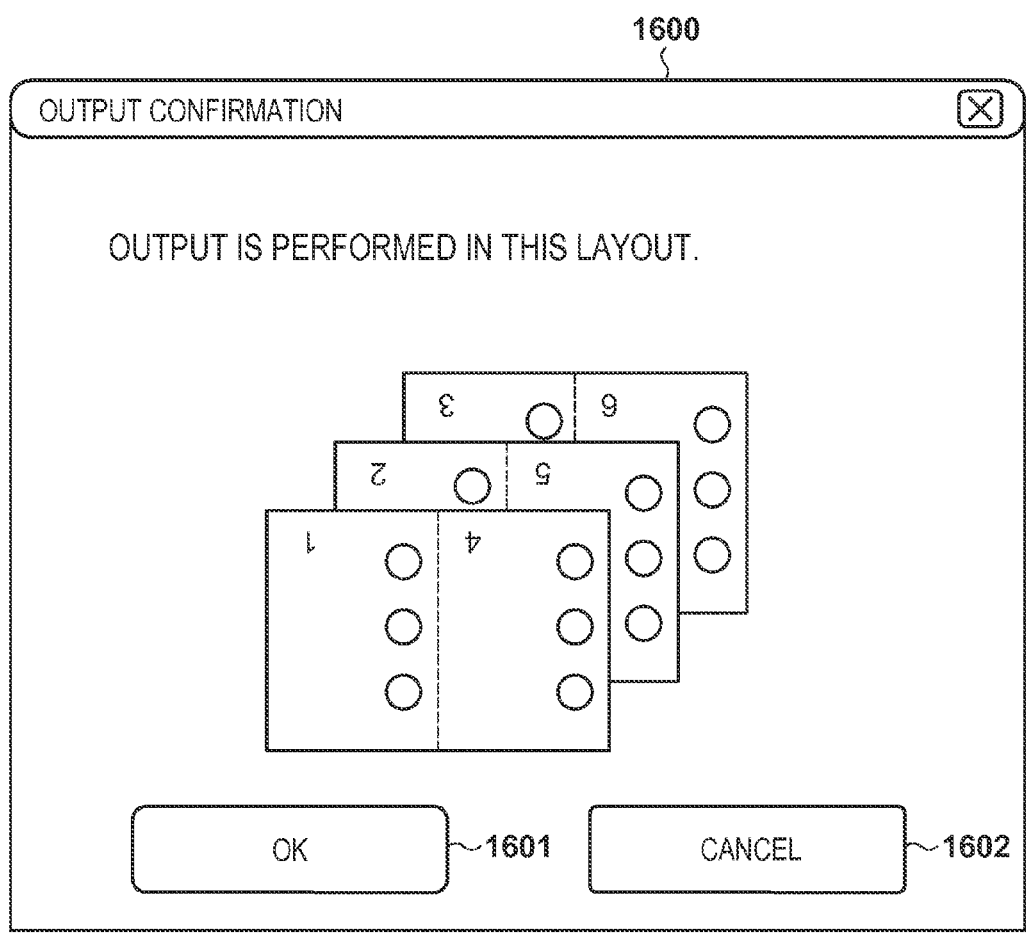
FIG. 16 is a view showing an exemplary layout confirmation screen at the time of output according to the second embodiment.

S1406, S1407, and S1409 are the same as S905, S906, and S907 in FIG. 9 described in the first embodiment, and, thus, a description thereof has been omitted. If it is determined in S1407 that the punching can be performed (YES in S1407), the procedure advances to S1408. In S1408, the printer driver displays the layout information decided on in S1405, in a display screen 1600 as shown in FIG. 16.

In S1410, the printer driver determines which of an OK button 1601 and a cancel button 1602 in the display screen 1600 is pressed by the user. If the OK button 1601 is pressed (YES in S1410), the procedure advances to S1411. If the cancel button 1602 is pressed (NO in S1410), this flowchart is ended.

S1411 and S1412 are the same as S909 and S910 in FIG. 9 described in the first embodiment, and, thus, a description thereof has been omitted.

As in the first embodiment, it is possible also in the second embodiment that the image layout is performed on the printer driver side, or that only the settings are sent to the image forming apparatus 103 and the layout is performed by the control unit 408 of the image forming apparatus 103. Also, it is possible that the information of the dies set in the puncher 106 in S1406 and S1407 is obtained in advance, and the punching that can be set in S1402 is limited according to the cut and stack designation in S1401.

As described above, the cut and stack layout and the punch positions in each page corresponding thereto are designated, and the layout is decided on, so that the user does not have to take into consideration the punching method in the puncher, the layout, or the image rotation.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™, a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-060795, filed Mar. 24, 2014, which is hereby incorporated by reference herein in its entirety.

What is claimed is:

1. An information processing apparatus comprising:
a setting unit configured to accept (i) a layout setting in a case of laying out a plurality of pages forming print data on one printing medium sheet and (ii) a punch processing setting for the printing medium sheet;
a decision unit configured to decide on respective orientations of the plurality of pages laid out on the printing medium sheet, based on the layout setting and the punch processing setting set by the setting unit; and
a control unit configured to cause a printing unit to print, on the printing medium sheet, the plurality of pages based on the orientations decided by the decision unit,
wherein the printing medium sheet is subjected to printing and is then cut by a post processing apparatus into pages,
wherein the decision unit decides on respective orientations of the plurality of laid out pages such that the same relationship between a position of punch holes punched by the punch processing and a page orientation is maintained between printing medium sheets respectively corresponding to the plurality of pages after cutting, and
wherein at least a part of the decision unit is implemented by a processor and a memory of the information processing apparatus.

2. The information processing apparatus according to claim 1, wherein the decision unit further decides on a plurality of punch positions in one printing medium sheet such that the same relationship between a position of punch holes punched by the punch processing and a page orientation is maintained between printing medium sheets respectively corresponding to the plurality of pages after cutting.

3. The information processing apparatus according to claim 1, wherein the punch processing setting indicates positions of punch holes in a printing medium sheet that has not been cut yet.

4. The information processing apparatus according to claim 1, wherein the punch processing setting indicates positions of punch holes in printing medium sheets respectively corresponding to the plurality of pages after cutting.

5. The information processing apparatus according to claim 1, wherein the layout setting includes designations of whether or not pages are to be rotated and which of single-sided printing and double-sided printing is to be performed.

6. The information processing apparatus according to claim 1, further comprising a unit configured to display the layout of the plurality of pages decided on by the decision unit.

7. The information processing apparatus according to claim 1, further comprising an obtaining unit configured to obtain information of punch dies provided in a post processing apparatus for performing punch processing on the printing medium sheet,
wherein the decision unit further determines whether or not the punch processing setting set by the setting unit can be executed, based on the information of the punch dies.

8. The information processing apparatus according to claim 7, further comprising a unit configured to display a warning in response to a determination result regarding the punch processing setting by the decision unit.

9. The information processing apparatus according to claim 1, further comprising a unit configured to generate a printing job based on the layout of the plurality of pages decided on by the decision unit, and send the printing job to an image forming apparatus.

10. A method for controlling an information processing apparatus, comprising:
a setting step of accepting (i) a layout setting in a case of laying out a plurality of pages forming print data on one printing medium sheet and (ii) a punch processing setting on the printing medium sheet;
a deciding step of deciding on respective orientations of the plurality of pages laid out on the printing medium sheet, based on the layout setting and the punch processing setting set in the setting step; and
a control step of causing a printing unit to print, on the printing medium sheet, the plurality of pages based on the orientations decided in the deciding step, wherein the printing medium sheet is subjected to printing and is then cut by a post processing apparatus into pages, and wherein respective orientations of the plurality of laid out pages are decided in the deciding step such that the same relationship between a position of punch holes punched by the punch processing and a page orientation is maintained between printing medium sheets respectively corresponding to the plurality of pages after cutting.

11. A non-transitory computer-readable medium storing a program for causing a computer to perform a method for controlling an information processing apparatus, the method comprising:

a setting step of accepting (i) a layout setting in a case of laying out a plurality of pages forming print data on one printing medium sheet and (ii) a punch processing setting for the printing medium sheet;

a deciding step of deciding on respective orientations of the plurality of pages laid out on the printing medium sheet, based on the layout setting and the punch processing setting set in the setting step; and a control step of causing a printing unit to print, on the printing medium sheet, the plurality of pages based on the orientations decided in the deciding step, wherein the printing medium sheet is subjected to printing and is then cut by a post processing apparatus into pages, wherein respective orientations of the plurality of laid out pages are decided in the deciding step such that the same relationship between a position of punch holes punched by the punch processing and a page orientation is maintained between printing medium sheets respectively corresponding to the plurality of pages after cutting.

12. An information processing apparatus comprising:

a setting unit configured to accept (i) a layout setting in a case of laying out a plurality of pages forming print data on one printing medium sheet and (ii) a punch processing setting for the printing medium sheet;

a decision unit configured to decide on respective orientations of the plurality of pages laid out on the printing medium sheet, based on the layout setting and the punch processing setting set by the setting unit; and a control unit configured to cause a printing unit to print, on the printing medium sheet, the plurality of pages based on the orientations decided by the decision unit, wherein the printing medium sheet is subjected to printing and is then cut by a post processing apparatus into pages, wherein the decision unit decides on respective orientations of the plurality of laid out pages so that the respective position of punch holes punched by the punch processing relative to the page orientation is maintained across a plurality of pages from a plurality of printing medium sheets, and wherein at least a part of the decision unit is implemented by a processor and a memory of the information processing apparatus.

\* \* \* \* \*